US006385671B1

(12) United States Patent
Hunsaker et al.

(10) Patent No.: US 6,385,671 B1
(45) Date of Patent: May 7, 2002

(54) METHOD/APPARATUS FOR FLUSHING DMA TRANSMIT PACKET IN FIFO WHEN SELF-ID CODE GENERATED BY COUNTER AFTER BUS RESET IS DIFFERENT THAN FIFO MESSAGE SELF-ID FIELD

(75) Inventors: Mikal C. Hunsaker, El Dorado Hills; Darren L. Abramson, Folsom, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/280,781

(22) Filed: Mar. 29, 1999

(51) Int. Cl.[7] .................. G06F 13/00; G06F 13/28; G06F 7/02; H04L 12/54; H04L 3/24
(52) U.S. Cl. .................. 710/28; 710/22; 710/33; 710/35; 710/52; 710/55; 709/212; 709/236; 370/300; 370/392; 370/412; 370/428; 370/429; 370/471; 370/473; 370/474; 714/819; 714/821; 712/225
(58) Field of Search .................. 710/20, 22, 33, 710/35, 52, 53, 54–57; 709/212, 236; 370/300, 392, 412, 413, 415, 428, 417, 429, 471, 473, 474; 714/819, 820, 821; 712/225

(56) References Cited

U.S. PATENT DOCUMENTS 5,579,503 A * 11/1996 Osborne .................. 711/119
5,634,069 A * 5/1997 Hicok et al. .................. 710/33
5,822,616 A * 10/1998 Hirooka .................. 710/22
5,958,029 A * 9/1999 McKinnon .................. 710/100
6,058,472 A * 5/2000 Panwar et al. .................. 712/218
6,201,815 B1 * 3/2001 Nomura .................. 370/429

* cited by examiner

Primary Examiner—Thomas Lee
Assistant Examiner—Tanh Q Nguyen
(74) Attorney, Agent, or Firm—Blakely, Sokoloff, Tayor & Zafman LLP (57) ABSTRACT

The present invention discloses a method and apparatus for processing a packet of data received from a direct memory access (DMA) engine. In one embodiment, a counter generates a self-ID code and increments the self-ID code after a bus reset. A formatter is coupled to the counter to format a start-of-packet (SOP) message which contains a self-ID field. The SOP message corresponds to the packet and the self-ID field corresponds to the self-ID code. A first-in-first-out (FIFO) is coupled to the formatter to store the SOP message and the packet. A comparator is coupled to the FIFO to compare the self-ID field of the message read from the FIFO with the self-ID code. A control circuit, which is coupled to the FIFO, flushes the packet if the self-ID field of the message is different than the self-ID code.

24 Claims, 10 Drawing Sheets

METHOD/APPARATUS FOR FLUSHING DMA TRANSMIT PACKET IN FIFO WHEN SELF-ID CODE GENERATED BY COUNTER AFTER BUS RESET IS DIFFERENT THAN FIFO MESSAGE SELF-ID FIELD

BACKGROUND OF THE INVENTION

1. Field of the Invention

This invention relates to computer systems. In particular, the invention relates to processing serial data using a single receive first-in first-out (FIFO) buffer.

2. Description of Related Art

The Institute of Electrical and Electronics Engineers (IEEE) 1394 is a high-speed serial interconnect that makes the convergence of consumer electronics and personal computers (PCs) possible. Products supporting 1394 protocols at 100 to 400 Megabits/sec (Mbps) are now commercially available. Products with speeds up to 3200 Mbps are available in a near future.

To promote product development and enhance industry, the Open Host Controller Interface (OHCI) specification defines basic protocols and operational modes to support the IEEE 1394 standard and its enhancements (e.g., 1394a).

An OHCI-compliant device has both transmitter and receiver functionalities and acts as an interface between the host processor in the PC and the physical link to the 1394 peripheral devices. To enhance transfer rate, direct memory access (DMA) engines are used to transfer data in and out of the host processor's memory. In addition, first-in-first-out (FIFO) memories are used to buffer transmitted and received data for the corresponding DMA engines.

There are a number of problems associated with the FIFO-based receive and transmit contexts. On the receive side, these problems include context shutdown, context decoding, and packet trailer processing. On the transmit side, one problem is the proper flushing of an asynchronous transmit packet after a bus reset.

A context shutdown refers to a process in which a DMA engine is shut down and does not process packet data further. One way to implement a context shutdown mechanism is to provide external logic to keep track of the number of packets for each context that are in the FIFO at any given time. This method, however, requires additional hardware and adds complexity to the device. Another way is to merely flush the received packet data in the FIFO after shutting down and provide the status information to the host software. This method wastes data bandwidth because the received packet data are discarded unnecessarily.

Context decoding refers to a process in which the received packet is decoded prior to being transferred to the appropriate DMA engine for further processing. The packet information useful for DMA processing includes packet type, length, speed code, errors, etc. One method for context encoding/decoding is to include the packet information for DMA processing in the packet header. This method, however, requires the DMA engine to examine the packet header, incurring processing time. Another method is to provide external logic to keep track of the start and end points within a FIFO. This method, however, is expensive and places arbitrary limits on the number of packets that could be contained within the FIFO.

Packet trailer processing refers to the process in which a 32-bit packet trailer is written into memory as required by the 1394 OHCI. One way to do this is to write the packet trailer as a stand-alone operation after the packet has been written into the memory. This method, however, wastes bandwidth due to additional overhead for the DMA engine to process the packet trailer separately.

Flushing an asynchronous transmit (AT) packet refers to a process of discarding the AT packet in the FIFO after a 1394 bus reset. A bus reset may change the destination identification (ID) code for the packet. Therefore, after a bus reset, the packet data in the FIFO may still contain the old destination ID which is no longer valid. One way to flush the invalid packets is to read each entry in the FIFO to flush the entire FIFO. However, for a 256-entry FIFO, this flushing may take up to 256 clocks. This can be a long wait when there are many DMA transmit packets ready to be sent to the AT FIFO Therefore there is a need in the technology to provide an efficient technique to process the serial packet data for receive FIFO and flushing of transmit FIFO data after a bus reset.

SUMMARY OF THE INVENTION

The present invention discloses a method and apparatus for processing a packet of data received from a direct memory access (DMA) engine. In one embodiment, a counter generates a self-ID code and increments the self-ID code after a bus reset. A formatter is coupled to the counter to format a start-of-packet (SOP) message which contains a self-ID field. The SOP message corresponds to the packet and the self-ID field corresponds to the self-ID code. A first-in-first-out (FIFO) is coupled to the formatter to store the SOP message and the packet. A comparator is coupled to the FIFO to compare the self-ID field of the message read from the FIFO with the self-ID code. A control circuit, which is coupled to the FIFO, flushes the packet if the self-ID field of the message is different than the self-ID code.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and apparatus for processing serial packet data using a single receive FIFO and an asynchronous transmit FIFO. Formats of end-of-context (EOC), start-of-packet (SOP), and end-of-packet (EOP) messages are defined. Control bits of the messages are used to insert the packet trailer into the packet data stream. A self-ID generation counter is incremented when a 1394 bus reset is detected. The self-ID field of the SOP transmit packet is compared with the self-ID generation counter to determine whether or not the AT packet is invalid and needs to be flushed. The invention provides a simple and efficient technique to process 1394 packet data with minimal hardware.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Terminology

Active: A signal is active when it is at a level that invokes its intended function. A signal is inactive when it is at a level that does not invoke its intended function. An active HIGH (or LOW) signal is a signal that will perform its function when it is at a HIGH (or LOW) level.

Asserting a signal: rendering the signal to its active state.

Deasserting a signal: rendering the signal to its inactive state.

Asynchronous transfer: a type of data transfer that guarantees delivery of data. Retries are acceptable.

Isochronous transfer: a type of data transfer that guarantees timing because late data would be useless. Isochronous transfers never retry.

Quadlet: 32-bit word (four bytes).

DMA: direct memory access.

DMA context: a distinct logical data stream.

DMA engine: a hardware mechanism to perform direct memory access and also accelerate transaction and bus management.

Node: basic addressable device.

PHY: abbreviation for physical layer.

Self ID: During bus reset processing, each node sends out a self-ID packet. A self-ID packet contains 1394 node information such as the node number and physical speed. The serial bus manager uses the self-ID information to build a speed map and a topology map.

Unit/Component: part of a node, defined by a higher level architecture. Examples: audio-visual devices (e.g., video cassette recorder, camcorder).

System and Device Environment

Figure 1:
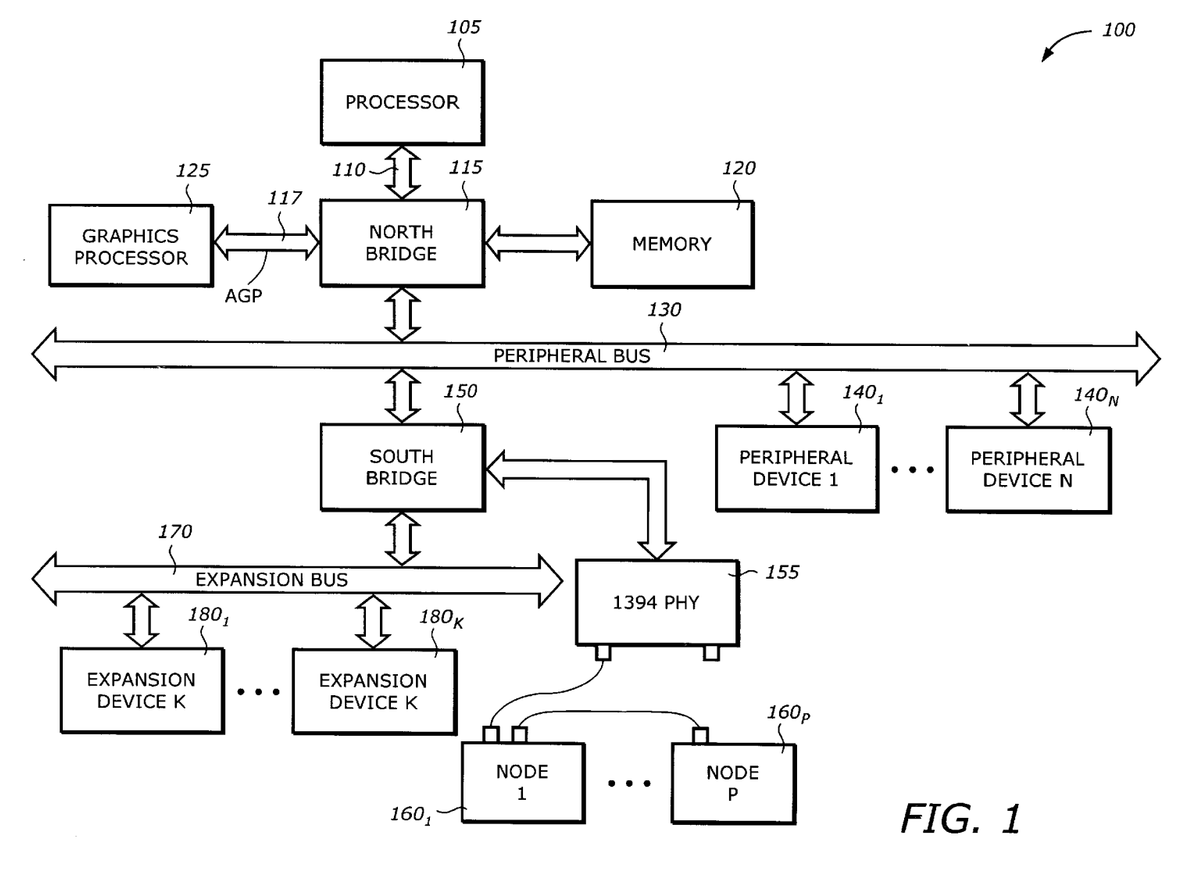
FIG. 1 is a diagram illustrating one embodiment of a system in accordance with the teachings of the invention.

FIG. 1 is a diagram illustrating one embodiment of a system 100 in accordance with the teachings of the invention. The system 100 includes a processor 105, a north bridge 115, a host bus 110, a memory 120, a graphics processor 125, an Accelerated Graphics Port (AGP) interface 117, a peripheral bridge 130, a south bridge 150, N peripheral devices $140_1$ to $140_N$, a 1394 physical interface 155, a serial bus 165, P nodes $160_1$ to $160_P$, an expansion bridge 170, and K expansion devices $180_1$ to $180_K$. It is to be appreciated by one skilled in the art that the specific architecture of the system 100 is not critical in practicing the present invention, as variations may be made to the system 100 without departing from the spirit and scope of the present invention.

The processor 105 may be any type of microprocessor such as a general purpose microprocessor or a microcontroller. The processor is coupled to the north bridge 115 via the host bus 110. The north bridge 115 provides an interface to other devices and to the peripheral bus 130. In one embodiment, the north bridge 115 is a host to Peripheral Component Interconnect (PCI) bus 130. The peripheral bus 130 provides interfaces to peripheral devices $140_1$ to $140_N$. Examples of the peripheral devices $140_1$ to $140_N$ include disk controller, communication card, etc. The graphics processor 125 is any graphic controller that processes and manipulates graphical data for displaying. The graphic processor 125 is coupled to the north bridge 115 by the AGP bus 117. The memory 120 is the system memory that stores programs and data to be used by the processor 105 and other processors/devices that have memory access capability. The memory 120 may contain any type of memory, including read only memory (ROM), random access memory (RAM), dynamic RAM (DRAM), static RAM (SRAM), flash memory, etc.

The south bridge 150 includes circuits for interfacing to the peripheral bus 130, the expansion bus 170, and the serial bus 165 through the physical link interface 155. In addition, the south bridge 150 includes buffer memory, control logic, and other input/output functions to be described later. The south bridge 150 provides an interface to the peripheral bus 130 and the expansion bus 170. In the embodiment shown, the expansion bus 170 is the Industry Standard Architecture ("ISA") bus, although any other type of bus architecture may be used. The expansion bus 170 provides a communication path between the peripheral bus 130 and a plurality of expansion devices $180_1$ to $180_K$ (e.g., a disk drive controller, a sound card, a modem, a serial and parallel port controller).

The south bridge 150 bridges transactions from the peripheral bus 130 and the serial bus 165. In one embodiment, the serial bus is a 1394 serial bus in accordance with the "IEEE 1394-1995 High Performance Serial Bus" published in 1995, although any other serial bus architecture may be used. The south bridge 150 is coupled to the 1394 physical link interface 155. The physical link interface 155 provides the physical-level interfaces to the nodes $160_1$ to $160_P$. The nodes $160_1$ to $160_P$ are the serial (e.g., 1394) nodes which correspond to devices that are coupled to the serial bus such as video disk systems, printer, etc.

Figure 2:
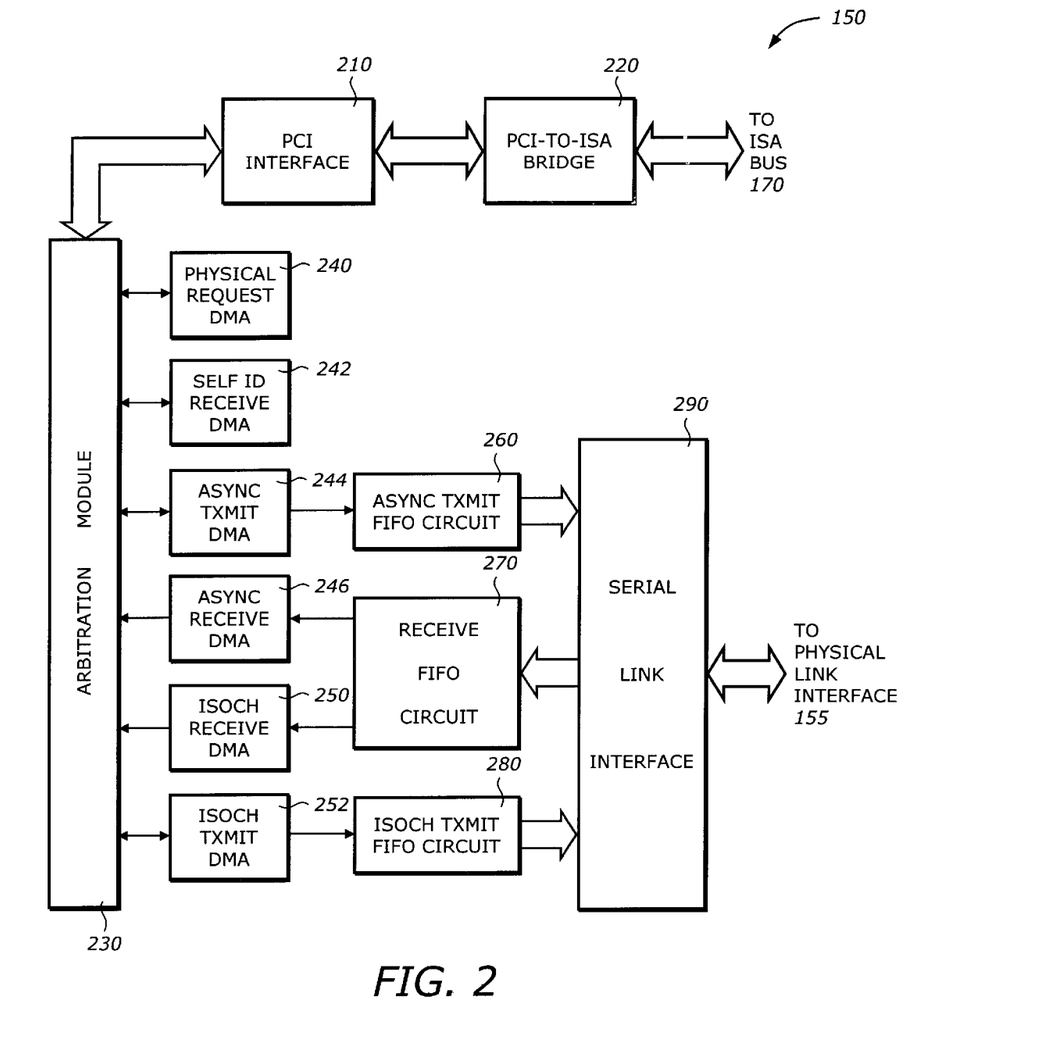
FIG. 2 is a diagram illustrating a south bridge according to one embodiment of the invention.

FIG. 2 is a diagram illustrating a south bridge 150 according to one embodiment of the invention. The south bridge 150 includes a peripheral bus interface 210, a peripheral-to-expansion bridge 220, an arbitration module 230, six types of direct memory access (DMA) engines 240, 242, 244, 246, 250, and 252, an asynchronous transmitter FIFO circuit 260, a receive FIFO circuit 270, an isochronous transmitter FIFO circuit 280, and a serial link interface circuit 290. The south bridge 150 can be controlled by the processor 105 via the north bridge 115. The south bridge 150 essentially performs the control and management of data transfers, storage, buffering, and communication between the host processor 105 and other devices and the nodes $160_1$ to $160_P$.

The peripheral bus interface 210 provides interface circuits to communicate with the peripheral bus 130. In one embodiment, the peripheral bus interface 210 is a PCI interface which provides interface circuits to the PCI bus.

The peripheral-to-expansion bridge 220 bridges the transaction between the peripheral bus 130 and the expansion bus 170. In one embodiment, the peripheral-to-expansion bridge 220 is a PCI-to-ISA bridge.

The arbitration module 230 arbitrates accesses as requested from the DMA engines 240, 242, 244, 246, 250, and 252 to the peripheral bus 130 via the peripheral bus interface 210. The physical request DMA engine 240 performs physical request DMA. The self-ID receive DMA engine 242 performs the self-ID DMA. In one embodiment, the physical request and the self-ID DMA engines 240 and 242 are not shut down (e.g., terminated) by software via the peripheral interface 210. The asynchronous transmit DMA engine 244 transfers the memory data to the asynchronous transmit FIFO circuit 260. The asynchronous receive and isochronous receive DMA engines 246 and 250 read received data from the receive FIFO circuit 270 to transfer to the memory. In the embodiment shown in FIG. 2, there is one receive FIFO circuit 270 that is used to provide data to four DMA engines 240, 242, 246 and 250. The isochronous transmit DMA engine 252 transfers data from memory to the isochronous transmit FIFO circuit 280. In one embodiment, each of the asynchronous transmit and receive DMAs has two separate DMA circuits for two different asynchronous DMA contexts, and each of the isochronous receive and transmit DMAs has four separate DMA circuits for four different isochronous DMA contexts.

The asynchronous and isochronous transmit FIFO circuits 260 and 280 buffer the data from the corresponding DMA engines to send to the serial bus via the physical link interface 155. The receive FIFO circuit 270 receives and buffers the data received from the serial bus. In one embodiment, the asynchronous, isochronous, physical and self-ID receive data are processed by the same receive FIFO circuit 270. In other embodiments, separate receive FIFO circuits may be used for each DMA context. The serial link interface circuit 290 is coupled to the physical link interface 155 to provide interface to the serial bus 165.

Control and Management of FIFO Data

Referring to FIG. 2 again, the receive FIFO circuit 270 buffers packet data as received by the serial link interface circuit 290. The receive FIFO circuit 270 then routes the data to the appropriate DMA engine which will command the PCI interface 210, to transfer the packet data to the memory.

The serial data stream coming from the serial bus is processed and presented to the receive FIFO circuit 270 via the physical link interface 155 and the serial link interface circuit 290. The basic data word length is 32-bit. It is desirable to provide a well structured quadlet format with functionalities defined for an efficient data transfer and management.

One of the useful functionalities is to distinguish between a message quadlet and a data quadlet. A message quadlet contains information that is not part of the data to be transferred. A data quadlet contains the data that is to be transferred to the memory. A message quadlet provides additional information that is useful for the control and management of the data transfer. Examples of the additional information include the delimiting conditions, or delimiters, such as the Start-Of-Packet (SOP), End-Of-Packet (EOP), and End-Of-Context (EOC). Other additional information such as destination DMA context, packet length and type, etc. can help the packet decoding logic to decode, route, and process the packet data appropriately.

The EOC delimiter is useful when a DMA engine is shutdown by software or when a DMA error occurs. If a DMA engine is shut down or is inactive, it is desirable that the receive FIFO circuit 270 does not accept further packets for that DMA context. At the same time, the DMA engine should continue to remain active long enough to finish processing packets that have already been queued in the FIFO.

Figure 3:
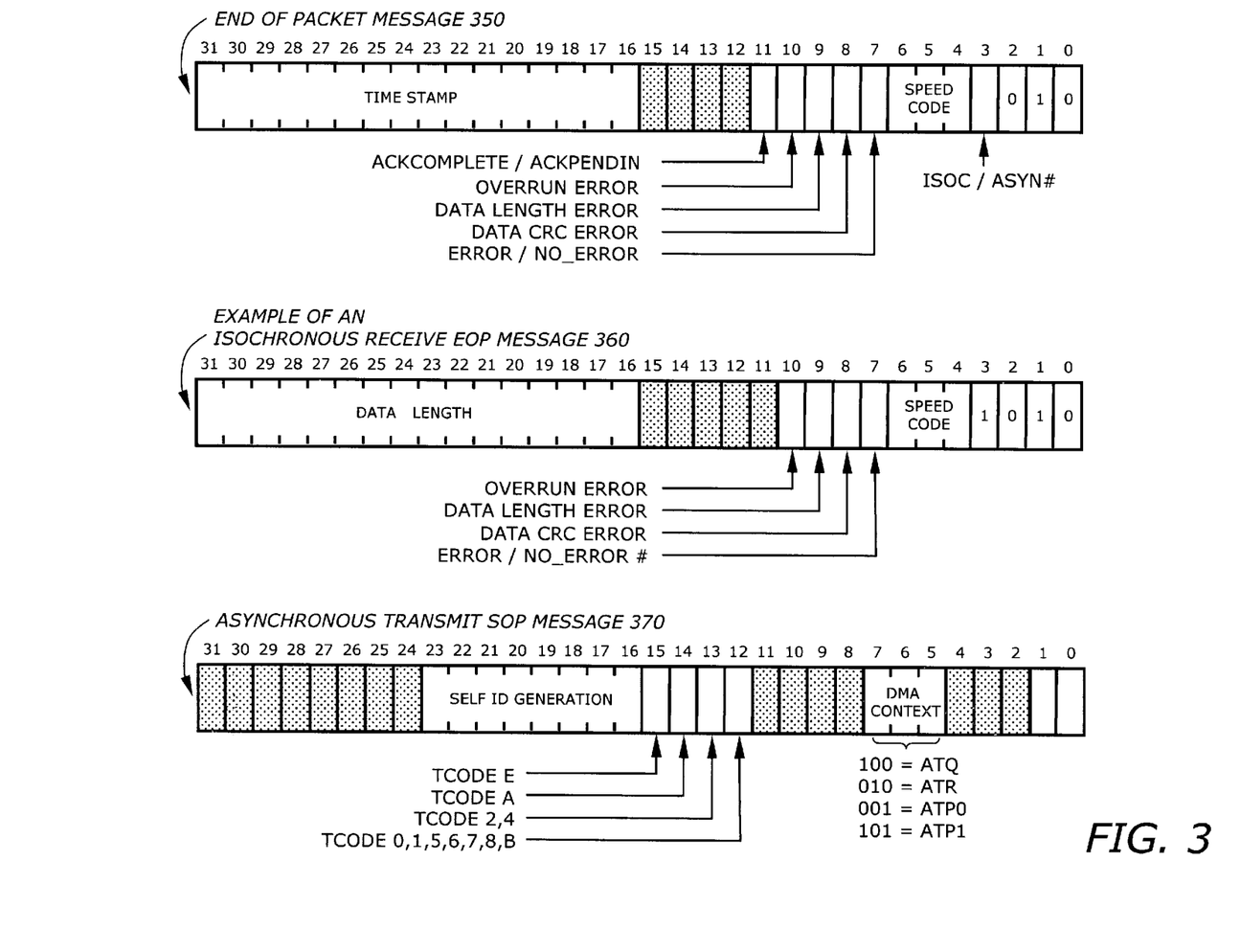
FIG. 3 is a diagram illustrating formats of messages according to one embodiment of the invention.

The EOP delimiter is useful to mark the end of a packet. Its position can be used to insert a quadlet packet trailer into the data stream as required by the 1394 OHCI. The packet trailer consists of the 1394 time stamp at the time the packet was received along with the current contents of the lower 16 bits of the context control register which includes DMA and packet status information. When a packet arrives at the top of the FIFO, the DMA engine issues commands to the bus interface unit, the PCI interface 210 on FIG. 2, to transfer the FIFO contents to memory. In one embodiment, the packet trailer is not in the FIFO, but rather is created by merging contents of the context control register control bits, the event and speed codes, and the time stamp from the EOP message as shown in FIG. 3B.

In one embodiment, the bus interface unit should not flush the EOP message from the FIFO. The reading of the EOP packet is gated because the actual length of a packet may be different from what is included in the packet header in an error condition. If the packet is shorter than expected, commands will have been given to the bus interface unit for the expected length and the EOP will arrive at the top of the FIFO sooner than expected. Blocking the flushing of the EOP by the bus interface unit prevents flushing beyond a packet boundary in an error condition. The DMA engine will flush the EOP after the packet and the packet trailer have been successfully written to memory.

Quadlet Format

The control and management of the FIFO data for encoding/decoding, shutdown condition, and packet trailer insertion are facilitated by having a well-defined quadlet format. FIG. 3 is a diagram illustrating a quadlet format according to one embodiment of the invention. The quadlet format includes a general EOC/EOP/SOP message 310, a general isochronous SOP message 320, a general asynchronous SOP message 330, an example of an asynchronous receive request SOP message 340, an EOP message 350, an example of an isochronous receive EOP message 360, and an asynchronous transmit SOP message 370.

Added to the 32-bit quadlet is a message bit, bit 32, which is used to distinguish whether a quadlet is a message quadlet or a data quadlet. If a quadlet is determined to be a message quadlet, other control bits in the quadlet are examined to determine the type of message.

The general EOC/EOP/SOP message 310 includes three control bits to indicate if the message is an EOC, EOP, or SOP message. In one embodiment, these control bits are the three least significant bits of the message (bits 0, 1, and 2). Bits 0, 1, and 2 correspond to the SOP, EOP, and EOC bit, respectively. These bits are mutually exclusive in that only one bit is asserted at a time. Furthermore, if the message bit (bit 32) is asserted indicating that the quadlet is a message quadlet, then one of these bits is asserted to indicate the type of message.

The bit assignment is as follows:

| Bit No. | Type |
|---|---|
| 0 | Start Of Packet (SOP) |
| 1 | End Of Packet (EOP) |
| 2 | End Of Context (EOC) |
| 3–31 | Message packet and context specific information |
| 32 | Message bit: message quadlet (if 1) or data quadlet (if 0) |

The message 320 is an isochronous SOP message (bits 0–3 are 1, 0, 0, and 1, respectively). The bit assignment is as follows.

| Bit No. | Type |
|---|---|
| 0–3 | 1 0 0 1 = isochronous SOP message |
| 4 | DMA Context 0 |
| 5 | DMA Context 1 |
| 6 | DMA Context 2 |
| 7 | DMA Context 3 |
| 8 | Reserved |
| 9–12 | Synchronization |
| 13–15 | Don't cares |
| 16–31 | Data length |

The message 330 is an asynchronous SOP message (bits 0 through 3 are 1, 0, 0, 0, respectively). The bit assignment is as follows.

| Bit No. | Type |
|---|---|
| 0–3 | 1 0 0 1 = asynchronous SOP message |
| 4 | DMA Context: Self-ID |
| 5 | DMA context: Physical |
| 6 | DMA context: Response |
| 7 | DMA context: Request |
| 8–15 | DMA context specific |
| 16–31 | Data length |

The message 340 is an asynchronous receive request SOP message (bits 0 through 7 are 1, 0, 0, 0, 0, 0, 0, and 1, respectively). The bit assignment is as follows:

| Bit No. | Type |
|---|---|
| 0–7 | 1 0 0 0 0 0 0 1 = asynchronous request SOP message |
| 8 | Bus reset |
| 9 | Physical layer (PHY) |
| 10 | Lock compare-swap request |
| 11 | Block write request |
| 12 | Block read request |
| 13 | Quadlet write request |
| 14 | Quadlet read request |
| 15 | Don't care |
| 16–31 | Data length |

The message 350 is an EOP message (bits 0–2 are 0, 1, and 0, respectively). The bit assignment is as follows

| Bit No. | Type |
|---|---|
| 0–3 | 0, 1, 0, 0 (EOP message) |
| 4–6 | Speed code |
| 7 | Error (if HIGH) or No error (if LOW) |
| 8 | Data cyclic redundancy code (CRC) error |
| 9 | Data length error |
| 10 | Overrun error |
| 11 | Ack complete (if HIGH) or Ack pending (if LOW) |
| 12–15 | Don't cares |
| 16–31 | Time stamp |

The message 360 is an isochronous receive EOP message (bits 0 through 3 are 0, 1, 0, 1, respectively). The bit assignment is as follows:

| Bit No. | Type |
|---|---|
| 0–3 | 0 1 0 1 = isochronous receive EOP message |
| 4–6 | Speed code |
| 7 | Error (if HIGH) or No Error (if LOW) |
| 8 | Data cyclic redundancy code (CRC) error |
| 9 | Data length error |
| 10 | Overrun error |
| 11–15 | Don't cares |
| 16–31 | Time Stamp |

The message 370 is an asynchronous transmit SOP message (bits 0, 1 are 0 and 1, respectively). The bit assignment is as follows:

| Bit No. | Type |
|---|---|
| 0–1 | 0 1 = SOP message |
| 2–4 | Don't cares |
| 5–7 | DMA context |
| 8–11 | Don't cares |
| 12–15 | Transmit Codes |
| 16–23 | Self-ID generation number |
| 24–31 | Don't cares. |

It is to be appreciated by one skilled in the art that the specific quadlet format or bit assignment is not critical in practicing the present invention, as variations may be made to the quadlet format without departing from the spirit and scope of the present invention.

Receive FIFO

Figure 4:
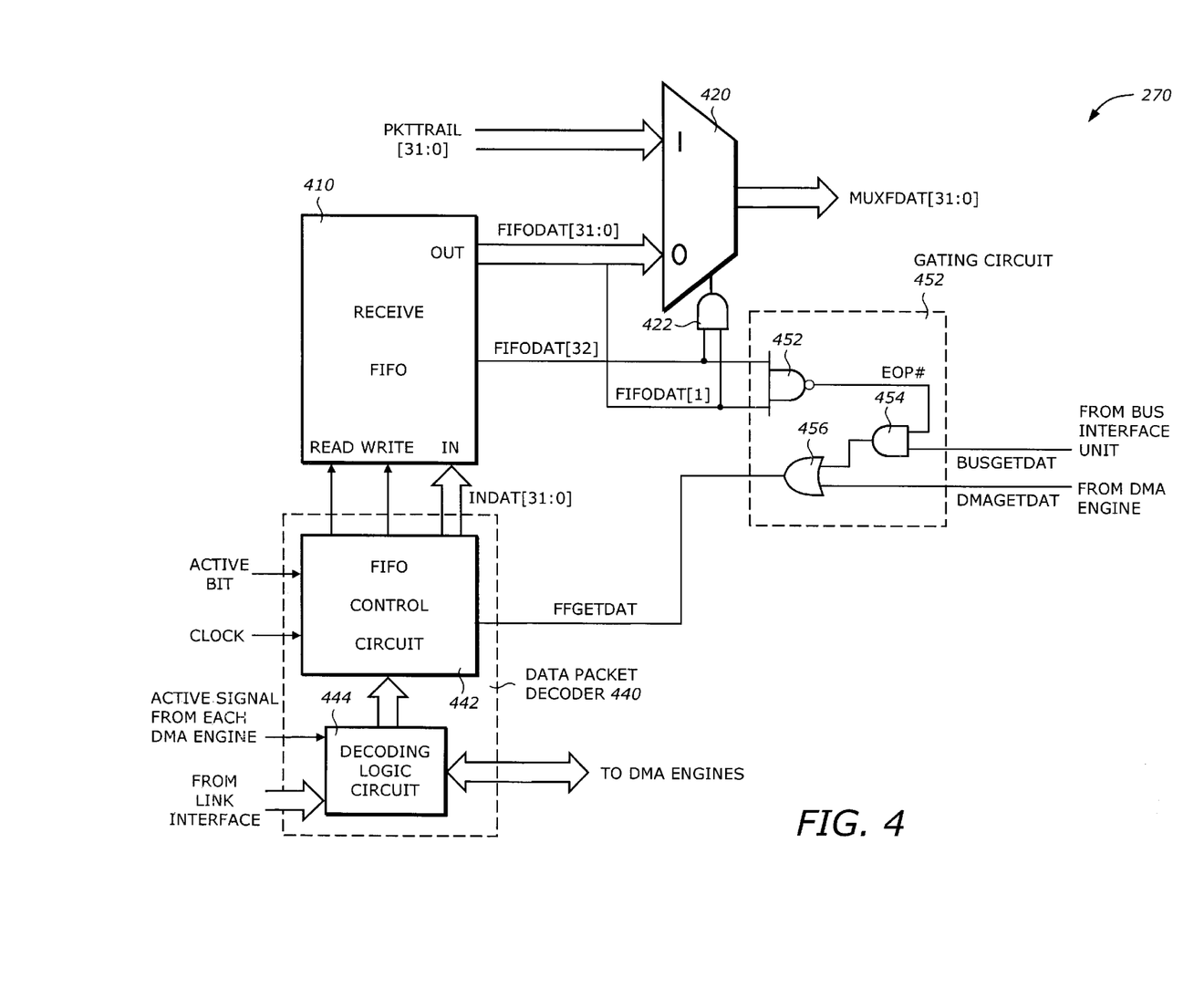
FIG. 4 is a diagram illustrating a receive FIFO circuit according to one embodiment of the invention.

FIG. 4 is a diagram illustrating a receive FIFO circuit 270 according to one embodiment of the invention. The receive FIFO circuit 270 includes a FIFO 410, a multiplexer 420, an AND gate 422, a data packet decoder 440, and a gating circuit 452.

The FIFO 410 is a first-in-first-out buffer memory with a word width of 33 bits. The input data is written into the FIFO through the INDAT[31:0] data path when the WRITE signal is enabled. The output data is read from the FIFO through the FIFODAT[31:0] data path when the READ signal is enabled. The FIFODAT[32] is the bit 32 of the quadlet. The FIFODAT[32] is the message bit and is used to indicate if the quadlet is a message (FIFODAT[32]=1) or a data (FIFODAT[32]=0).

The multiplexer 420 selects the data to be sent to the corresponding DMA engine based on the FIFODAT[32] and the FIFODAT[1] signals via the AND gate 422. If the FIFODAT[32] is 0, indicating data quadlet, the multiplexer 420 selects the data read from the FIFO, FIFODAT[31:0]. If the FIFODAT[32] is 1, indicating message quadlet, and if FIFODAT[1] is 1, indicating End-Of-Packet (EOP) message, the multiplexer 420 selects the packet trailer, PKTTRAIL[31:0]. The packet trailer PKTTRAIL[31:0] is created by merging the time stamp code with other pertinent information.

The data packet decoder 440 includes a FIFO control circuit 442 and a decoding logic circuit 444. The decoding logic circuit 444 receives the information from the link interface 290 (FIG. 2) and decodes the information to determine the destination DMA engine and other information. The decoding logic circuit 444 creates the message quadlet by setting bit 32.

The FIFO control circuit 442 receives an active bit, a clock signal, and the decoded information from the decoding logic circuit 444, and an FFGETDAT signal. The active bit is asserted by the corresponding DMA engine to inform the FIFO control logic circuit 442 that the FIFO is active and continues to accept data from the link interface 290. The FIFO control circuit 442 generates the read and write signals to the FIFO to enable the reading and writing of the FIFO. The FIFO control circuit 440 also routes the received data to the FIFO via the INDAT[31:0] data path. The FFGETDAT is a signal generated by the gating circuit 450 to indicate that the DMA engine is requesting the data from the FIFO or the bus interface unit is requesting the data from the FIFO (when the quadlet is not the EOP message).

The gating circuit 450 gates the read request from the bus interface unit to prevent the bus interface unit from flushing the EOP quadlet when the packet trailer is inserted in the data stream. The gating circuit includes a NAND gate 452, an AND gate 454, and an OR gate 456. The gating circuit 450 receives the FIFODAT[32], the FIFODAT[1], the BUSGETDAT, and the DMAGETDAT signals and generates the FFGETDAT signal.

When the FIFODAT[32] and FIFODAT[1] are both HIGH, indicating that the FIFO data being read is an EOP message, the NAND gate 452 generates a low signal, EOP#. The EOP# signal effectively disables the BUSGETDAT request from the bus interface unit by the AND gate 454. In other words, if the bus interface unit attempts to read the FIFO by asserting the BUSGETDAT, this attempt is masked off and the FIFO is not read. If, however, the DMAGETDAT is asserted HIGH, indicating that the DMA engine attempts to read the FIFO, the FFGETDAT signal is asserted, allowing the FIFO to be read. As is known by one skilled in the art, other logic circuits can be used to perform the same gating function.

Figure 5A:
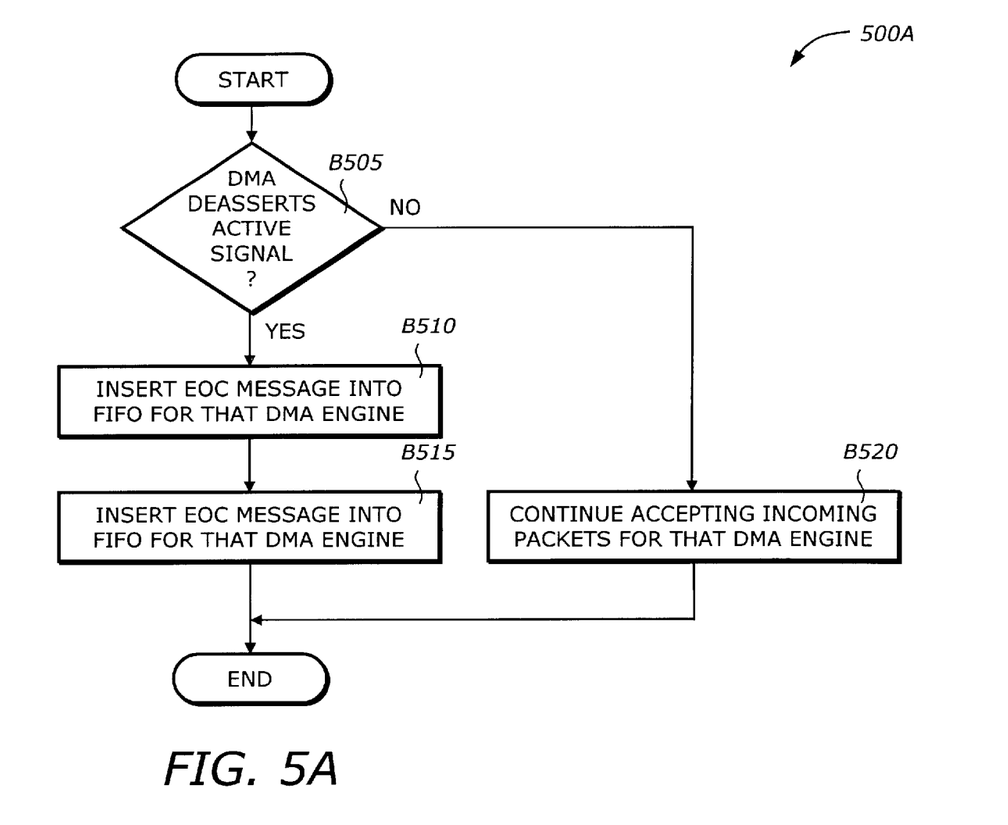
FIG. 5A is a flow diagram illustrating a process for shutting down a receive context on the decoder side according to one embodiment of the invention.

FIG. 5A is a flow diagram illustrating a process P500A for shutting down a receive context on the decoder side according to one embodiment of the invention.

Upon START, the process P500A determines if the DMA engine de-asserts the active signal (B505). If not, the process P500A continues accepting the incoming packets for that DMA engine (B520). The process P500A is then terminated.

If the DMA engine de-asserts the active signal, the process P500A inserts the EOC message into the FIFO for that DMA engine (B510). The process P500A then stops accepting packets for that DMA engine. The processs P500A is then terminated.

Figure 5B:
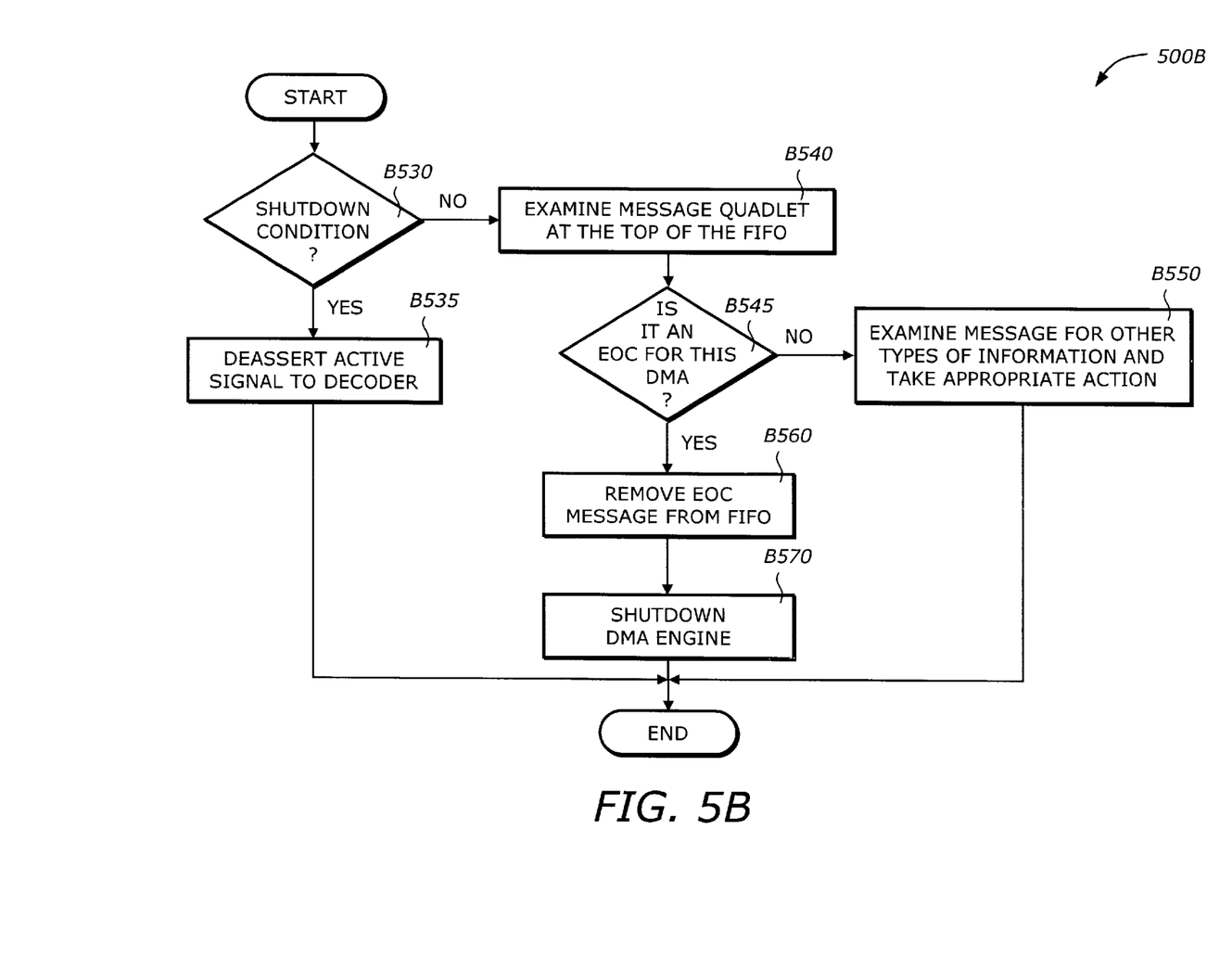
FIG. 5B is a flow diagram illustrating a process for shutting down a receive context on the DMA side according to one embodiment of the invention.

FIG. 5B is a flow diagram illustrating a process P500B for shutting down a receive context on the DMA side according to one embodiment of the invention.

Upon START, the process P500B determines if a shutdown condition has occurred (B530). A shutdown condition may occur as a result of a failed PCI data transfer, a bus error, a software shutting off the context, or any other condition that necessitates the shutdown of the receive context. If there is no shutdown condition, the process P500B enters block B540. If there is any shutdown condition, the process P500B de-asserts the active signal to the decoder (B535). The process P500B is then terminated.

If there is no shutdown condition, the process P500B examines the message quadlet at the top of the FIFO (B540). The process P500B then determines if the message quadlet is an EOC message for this DMA engine (B545). If not, the process P500B examines messages for other types of information and takes appropriate action (B550). Then the process P500B is terminated. If the message quadlet is an EOC message for this DMA engine, the process P500B removes the EOC message from the FIFO (Block B560) and then proceeds to shut down the corresponding DMA engine (B570). The process P500B is then terminated.

By using an EOC message, the receive FIFO circuit can continue to process data already in the FIFO and stop accepting more data from the link interface without incurring additional hardware overhead. The use of the EOC message, therefore, is a simple and efficient method to provide an orderly shutdown of a DMA engine.

Figure 6:
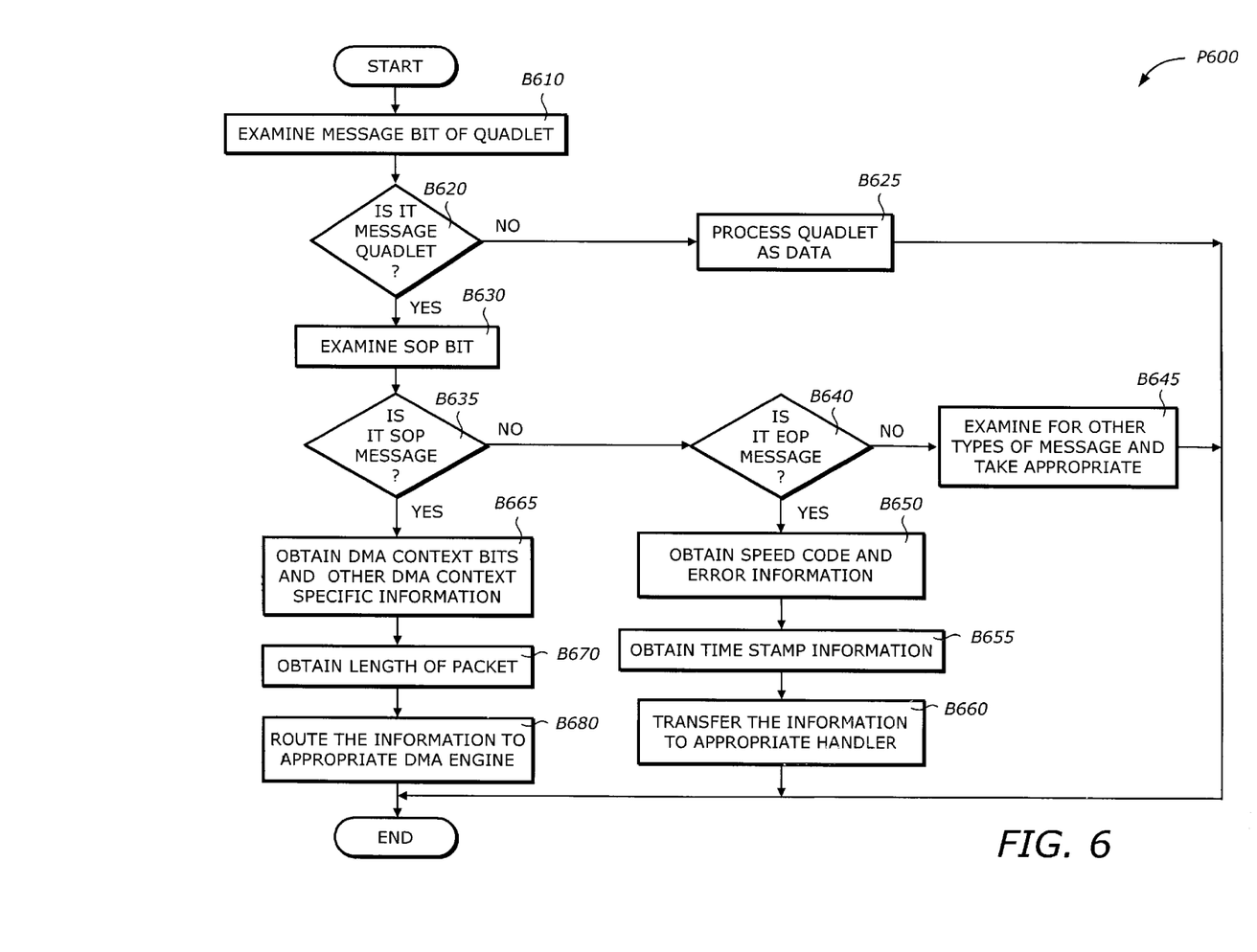
FIG. 6 is a flow diagram illustrating a process for decoding/encoding data packets according to one embodiment of the invention.

FIG. 6 is a flow diagram illustrating a process P600 for decoding/encoding data packets according to one embodiment of the invention.

Upon START, the process P600 examines the message bit of the quadlet (B610) to determine if the quadlet is a message quadlet (B620). If not, the process P500 processes the quadlet as data (B625) and then terminates. If it is a message quadlet, the process P600 examines the Start Of Packet (SOP) bit (B630) to determine if the message quadlet is an SOP message (B635). If it is not an SOP message, the process P600 determines if it is an EOP message (B640). If it is not an EOP message, then the process P600 examines other bits to determine the type of message of the quadlet and then takes appropriate action (B645). The process P600 then terminates.

If the message quadlet is an EOP message, then the process P600 obtains the speed code, error, and other pertinent information (B650). The process P600 also obtains the time stamp information (B655) and then transfers all the obtained information to the appropriate handler (B660). The handler may be a program, a function, a subroutine, or even a logic circuit that utilizes the obtained information for further processing. The process P600 then terminates.

If the message quadlet is an SOP message, the process P600 obtains the DMA context bits and other DMA context specific information as shown in FIG. 3 (B665). In particular, the process P600 obtains the length of packet (B670) so that the corresponding DMA engine can be prepared accordingly. The process P600 then routes the obtained information to the appropriate DMA engine (B680), The process P600 then terminates.

The SOP and EOP messages provide delimiting conditions for the receive FIFO to obtain relevant information for the corresponding DMA engines. The use of the SOP and EOP messages, therefore, is a simple and efficient method to process the data from the link interface.

Figure 7:
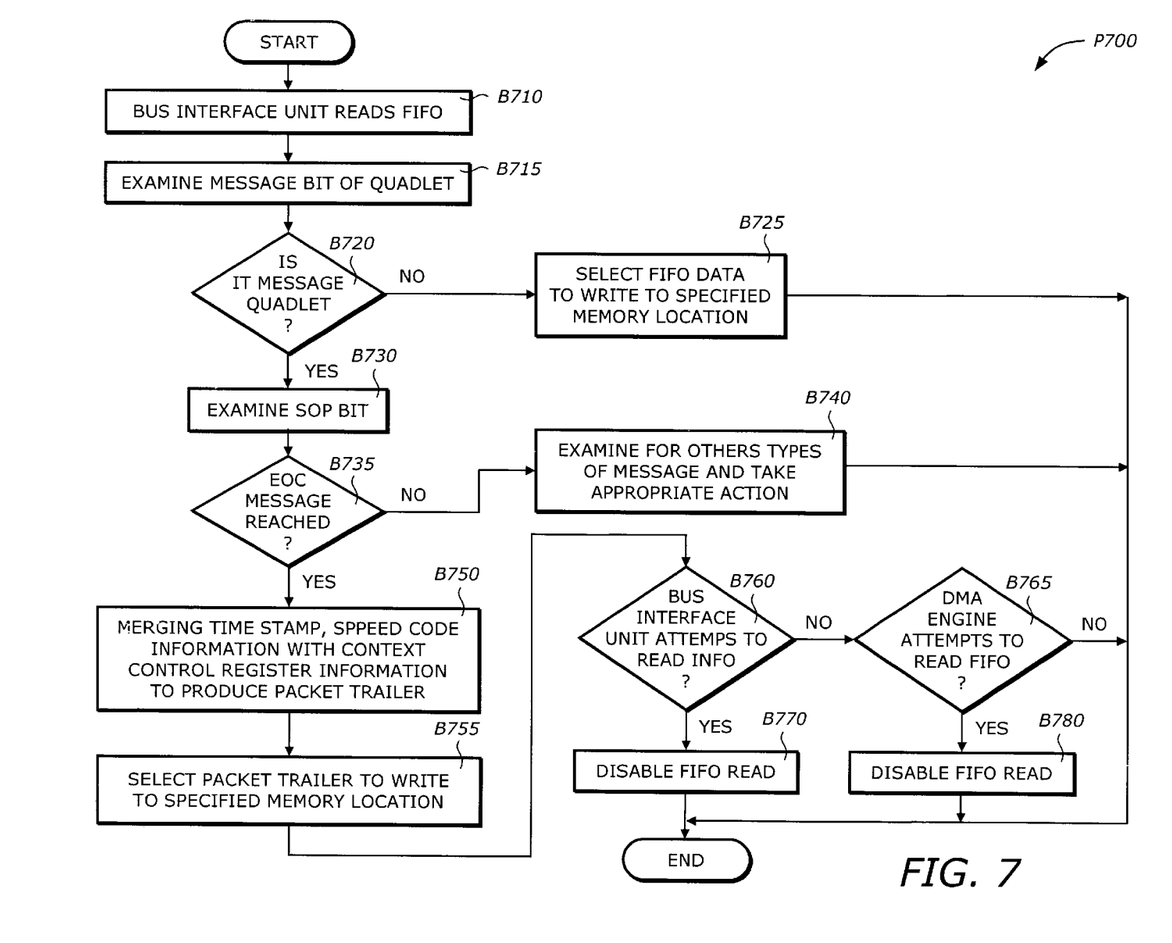
FIG. 7 is a flow diagram illustrating a process for inserting a packet trailer according to one embodiment of the invention.

FIG. 7 is a flow diagram illustrating a process P700 for inserting a packet trailer according to one embodiment of the invention.

Upon START, the process P700 reads the FIFO using the bus interface unit as commanded by the corresponding DMA engine (B710). The process P700 then examines the message bit of the quadlet read from the FIFO (B715) to determine of the quadlet is a message quadlet (B720). If not, the process P700 selects the FIFO quadlet to write to the specified memory location (B725) because the FIFO quadlet is the data quadlet. The process P700 then terminates.

If the quadlet is a message quadlet, the process P700 examines the End-Of-Packet (EOP) bit (B730) to determine if it is an EOP message (B735). If it is not an EOP message, the process P700 examines other control bits to determine the other types of message and then takes appropriate action (B740). The process P700 then terminates.

If the message quadlet is an EOP message, the process P700 merges the time stamp, speed code information with other information such as the context control register information to produce the packet trailer (B750). The process P700 then selects the packet trailer as produced and writes the selected packet trailer to the specified memory location (B755). The process P700 then determines if the bus interface unit attempts to read the FIFO (B760). If not, it is determined if the corresponding DMA engine attempts to read the FIFO. If the corresponding DMA engines does not attempt to read the FIFO, the process P700 terminates. If the corresponding DMA engines attempts to read the FIFO, the process P700 enables the FIFO read and allows the DMA engine to flush the EOP message (B780). The process P700 then terminates.

If the bus interface unit attempts to read the FIFO, the process P700 disables the FIFO read to prevent the bus interface unit from flushing the EOP message (B770). Thereafter, the process P700 terminates.

Transmit FIFO

The asynchronous transmit (AT) FIFO circuit 260 receives data from the asynchronous transmit (AT) DMA engine 244. The AT FIFO circuit 260 forwards the FIFO data to the serial link interface 290.

Figure 8:
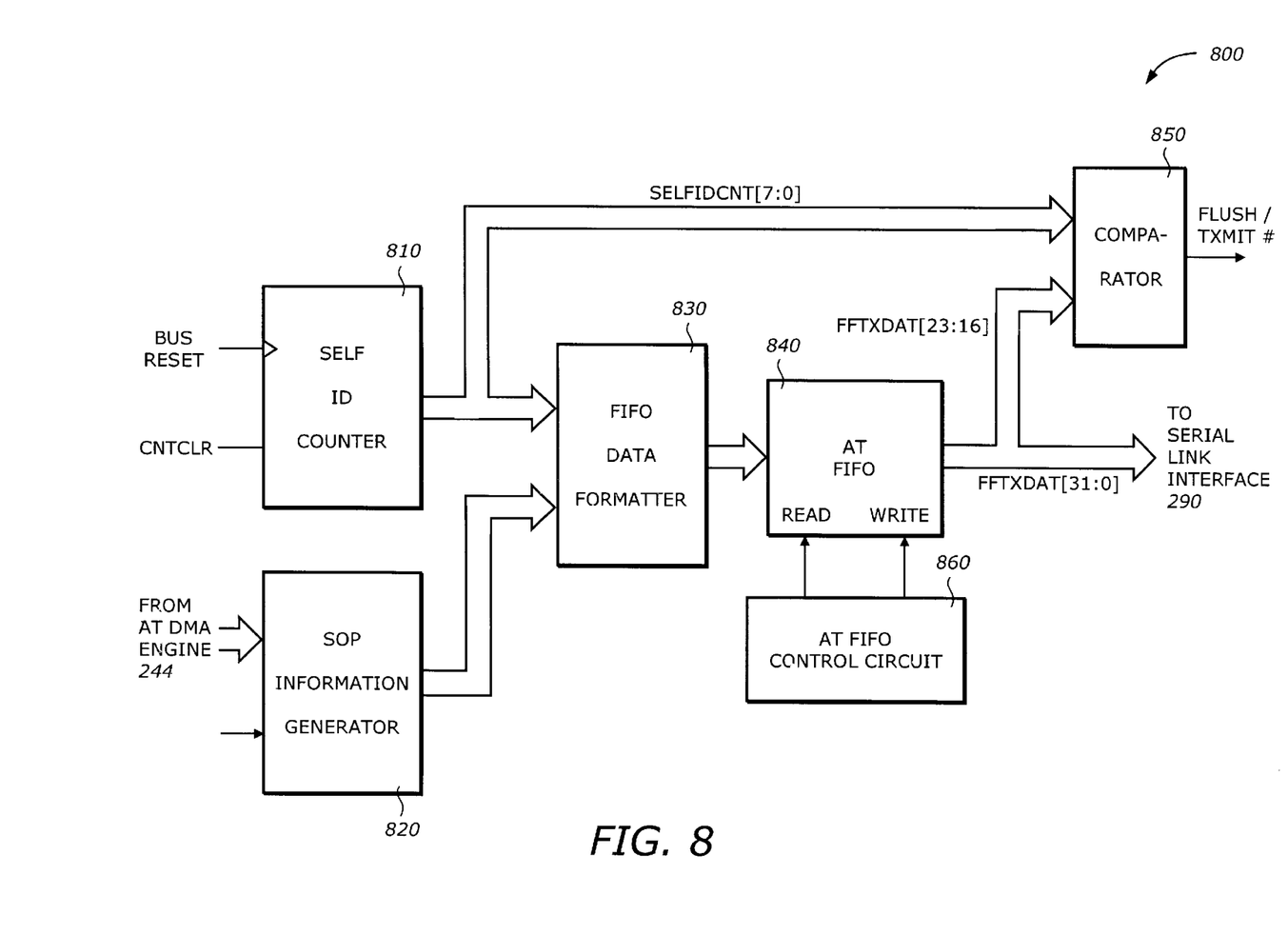
FIG. 8 is a diagram illustrating a transmit FIFO circuit according to one embodiment of the invention.

FIG. 8 is a diagram illustrating an asynchronous transmit (AT) FIFO circuit 800 according to one embodiment of the invention. The AT FIFO circuit 800 transmits asynchronous information. The AT FIFO circuit 800 includes a self-ID counter 810, an SOP information generator 820, a FIFO data formatter 830, an AT FIFO, 840, a comparator 850, and an AT FIFO control circuit 860.

The self-ID counter 810 is an N-bit counter. In one embodiment, N is 8, therefore the counter counts from 0 to 255 and then starts from 0 again. The self-ID counter 810 is incremented each time a bus reset occurs. It is therefore convenient to use the BUSRESET signal as the clock signal to the self-ID counter 810. The self-ID counter 810 is cleared or reset by the counter clear (CNTCLR) signal which may be asserted by software or by a system power-on-reset.

The SOP information generator 820 generates the necessary SOP information for the AT transmit FIFO packet data. This information may include the DMA context and the transmission code as shown in FIG. 3, element 370. The SOP information and the self-ID counter value are merged together or formatted by the FIFO data formatter 830 to produce an AT FIFO data to be written in to the AT FIFO 840. The AT FIFO control circuit 860 generates write and read signals to the AT FIFO 840 to write FIFO data into and read FIFO data from the AT FIFO 840.

The comparator 850 compares the output value at the self-ID counter and the self-ID generation field of the FIFO data read from the AT FIFO 840, the FFTXDAT[31:0], to determine if they are the same. The comparator 850 generates a FLUSH/TXMIT# signal to indicate if the read FIFO data, the FFTXDAT[31:0], should be flushed or transmitted.

Figure 9:
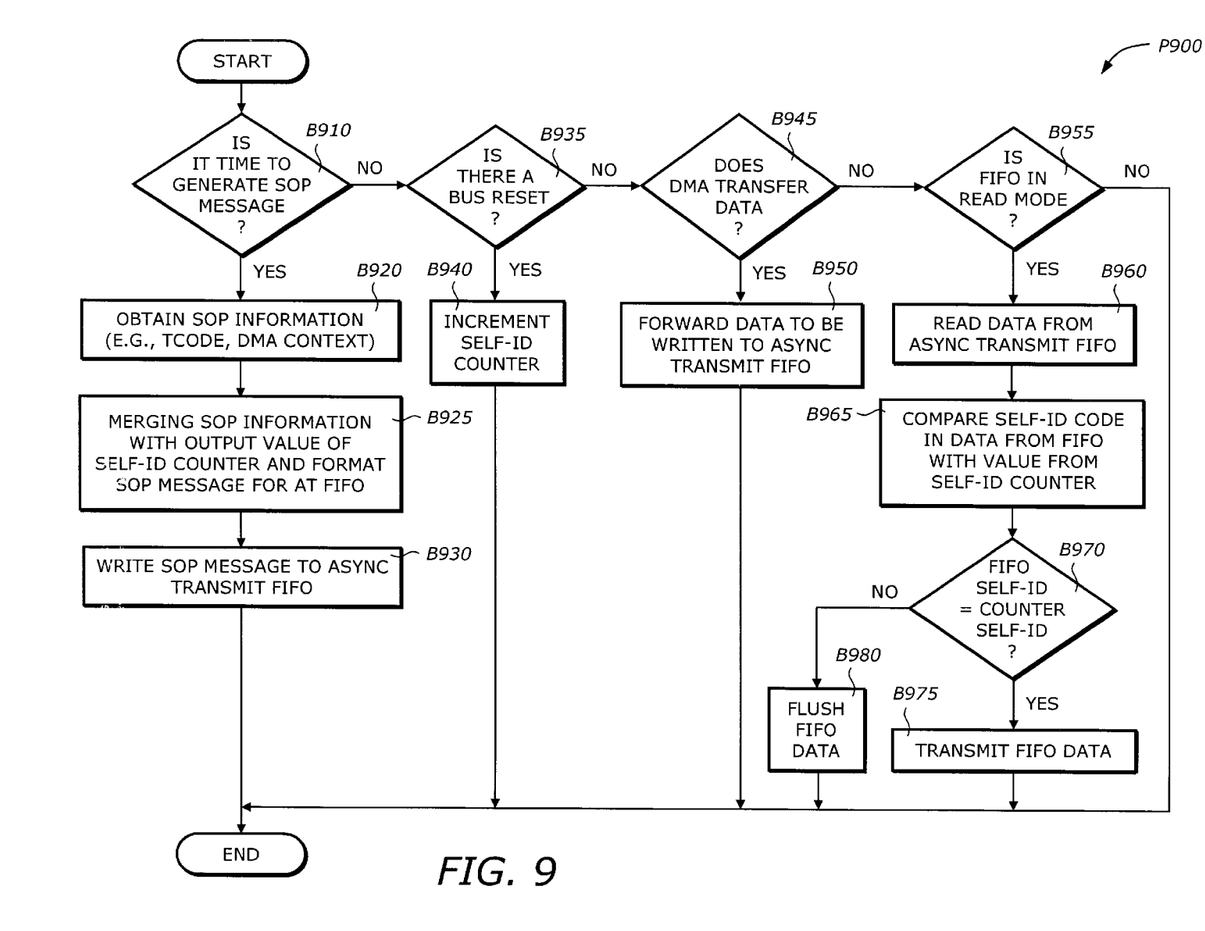
FIG. 9 is a flow diagram illustrating a process for proper flushing a transmit packet after a bus reset according to one embodiment of the invention.

FIG. 9 is a flow diagram illustrating a process for proper flushing a transmit packet after a bus reset according to one embodiment of the invention.

Upon START, the process P900 determines if it is time to generate an SOP message (B910). If not, the process P900 enters block B935. If it is time to generate SOP message, the process P900 obtains the SOP information (e.g., transmission code, DMA context) (B920) and merges this SOP information with the output value of the self-ID counter and formats the SOP message for the AT FIFO (B925). The SOP AT message is written to the AT FIFO (B930).

At block B935, the process P900 determines if there is a bus reset. If there is a bus reset, the process P900 increments the self-ID counter by 1. If the self-ID counter reaches 255, incrementing by one will start the counter back to zero. Then the process P900 terminates. If there is no bus reset, the process P900 determines if the transmit DMA engine transfers data to the FIFO (B945). If there is data transfer, the process P900 forwards the data to be written into the AT FIFO, and then terminates. If there is no DMA data transfer, the process P900 determines if the FIFO is in a read mode (B955), i.e., if the FIFO entries are being forwarded to the link interface 290 (FIG. 2).

If the AT FIFO is not in the read mode, the process P900 terminates the operation. Otherwise, the process P900 reads data from the AT FIFO (B960) and compares the self-ID generation field of the SOP message with the value at the self-ID counter (element 810 in FIG. 8) (B965). Then it is determined if these values are the same. If they are the same, then the packet is valid and the transmit FIFDO data is sent to the link interface. If they are not the same, it implies that the packet has been written into the FIFO before the bus reset occurs. Therefore the FIFO data is flushed.

The present invention therefore provides a technique to facilitate the processing of data on the receive and transmit sides. The receive technique includes the shutdown of the DMA context efficiently, the encoding of the quadlet with useful information, and the insertion of the quadlet trailer into the FIFO stream. The transmit technique includes the flushing of the FIFO data after a bus reset. These operations can be performed without incurring significant hardware overhead.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for processing data, the method comprising:
generating a self-ID code by a counter, the counter incrementing the self-ID code after a bus reset;
formatting a start-of-packet (SOP) message to contain a self-ID field, the SOP message corresponding to a packet received from a direct memory access (DMA) engine, the self-ID field corresponding to the self-ID code;
writing the SOP message into a fist-in-first-out (FIFO);
comparing the self-ID field of a message read from the FIFO with the self-ID code; and
flushing the packet if the self-ID field of the message read from the FIFO is different than the self-ID code.

2. The method of claim 1 wherein formatting the SOP message includes merging the self-ID code with SOP information.

3. The method of claim 1 further comprises:
if the self-ID field of the message is identical to the self-ID code, transferring the packet to a link interface for transmission to a serial bus.

4. The method of claim 1 wherein the counter wraps around to zero after reaching a maximum value.

5. The method of claim 2 wherein the SOP information includes DMA context code and transmission code.

6. The method of claim 2 wherein the SOP information includes a self-ID code.

7. The method of claim 3 wherein the serial bus is a 1394 bus.

8. The method of claim 1 wherein the DMA engine is an asynchronous transmit (AT) DMA engine.

9. An apparatus for processing data, the apparatus comprising:
a counter to generate a self-ID code, the counter incrementing the self-ID code after a bus reset;
a formatter coupled to the counter to format a start-of-packet (SOP) message to contain a self-ID field, the SOP message corresponding to a packet received from a direct memory access (DMA) engine, the self-ID field corresponding to the self-ID code;
a fist-in-first-out (FIFO) coupled to the formatter to store the SOP message and the packet;
a comparator coupled to the FIFO to compare the self-ID field of a message read from the FIFO with the self-ID code; and
a control circuit coupled to the FIFO, the control circuit flushing the packet if the self-ID field of the message read from the FIFO is different than the self-ID code.

10. The apparatus of claim 9 wherein the formatter merges the self-ID code with SOP information.

11. The apparatus of claim 9 wherein the control circuit transfers the packet to a link interface for transmission to a serial bus if the self-ID field of the message is identical to the self-ID code.

12. The apparatus of claim 9 wherein the counter wraps around to zero after reaching a maximum value.

13. The apparatus of claim 10 wherein the SOP information includes DMA context code and transmission code.

14. The apparatus of claim 10 wherein the SOP information includes a self-ID code.

15. The apparatus of claim 11 wherein the serial bus is a 1394 bus.

16. The apparatus of claim 1 wherein the DMA engine is an asynchronous transmit (AT) DMA engine.

17. A system comprising:
a first bus;
a processor coupled to the bus;
a memory coupled to the processor; and
a bridge couple to the first bus and a second bus via a physical link device, the bridge managing a transfer of a packet of data between the second bus and the processor, the bridge comprising:
a direct memory access (DMA) engine,
a counter to generate a self-ID code, the counter incrementing the self-ID code after a bus reset,
a formatter coupled to the counter to format a start-of-packet (SOP) message to contain a self-ID field, the SOP message corresponding to the packet, the self-ID field corresponding to the self-ID code,
a fist-in-first-out (FIFO) coupled to the formatter to store the SOP message and the packet,
a comparator coupled to the FIFO to compare the self-ID field of a message read from the FIFO with the self-ID code, and
a control circuit coupled to the FIFO, the control circuit flushing the packet if the self-ID field of the message read from the FIFO is different than the self-ID code.

18. The system of claim 17 wherein the formatter merges the self-ID code with SOP information.

19. The system of claim 17 wherein the control circuit transfers the packet to a link interface for transmission to a serial bus if the self-ID field of the message is identical to the self-ID code.

20. The system of claim 17 wherein the counter wraps around to zero after reaching a maximum value.

21. The system of claim 18 wherein the SOP information includes DMA context code and transmission code.

22. The system of claim 18 wherein the SOP information includes a self-ID code.

23. The system of claim 19 wherein the serial bus is a 1394 bus.

24. The system of claim 17 wherein the DMA engine is an asynchronous transmit (AT) DMA engine.

* * * * *

UNITED STATES PATENT AND TRADEMARK OFFICE
CERTIFICATE OF CORRECTION

PATENT NO. : 6,385,671 B1
DATED : May 7, 2002
INVENTOR(S) : Hunsaker et al.

It is certified that error appears in the above-identified patent and that said Letters Patent is hereby corrected as shown below:

Column 12,
Line 60, delete "fist-in-first-out" and insert -- first-in-first-out --.

Column 13,
Line 25, delete "fist-in-first-out" and insert -- first-in-first-out --.

Column 14,
Line 20, delete "fist-in-first-out" and insert -- first-in-first-out --.

Signed and Sealed this

Twentieth Day of August, 2002

*Attest:*

JAMES E. ROGAN
*Attesting Officer*     *Director of the United States Patent and Trademark Office*